UNITED STATES PATENT OFFICE.

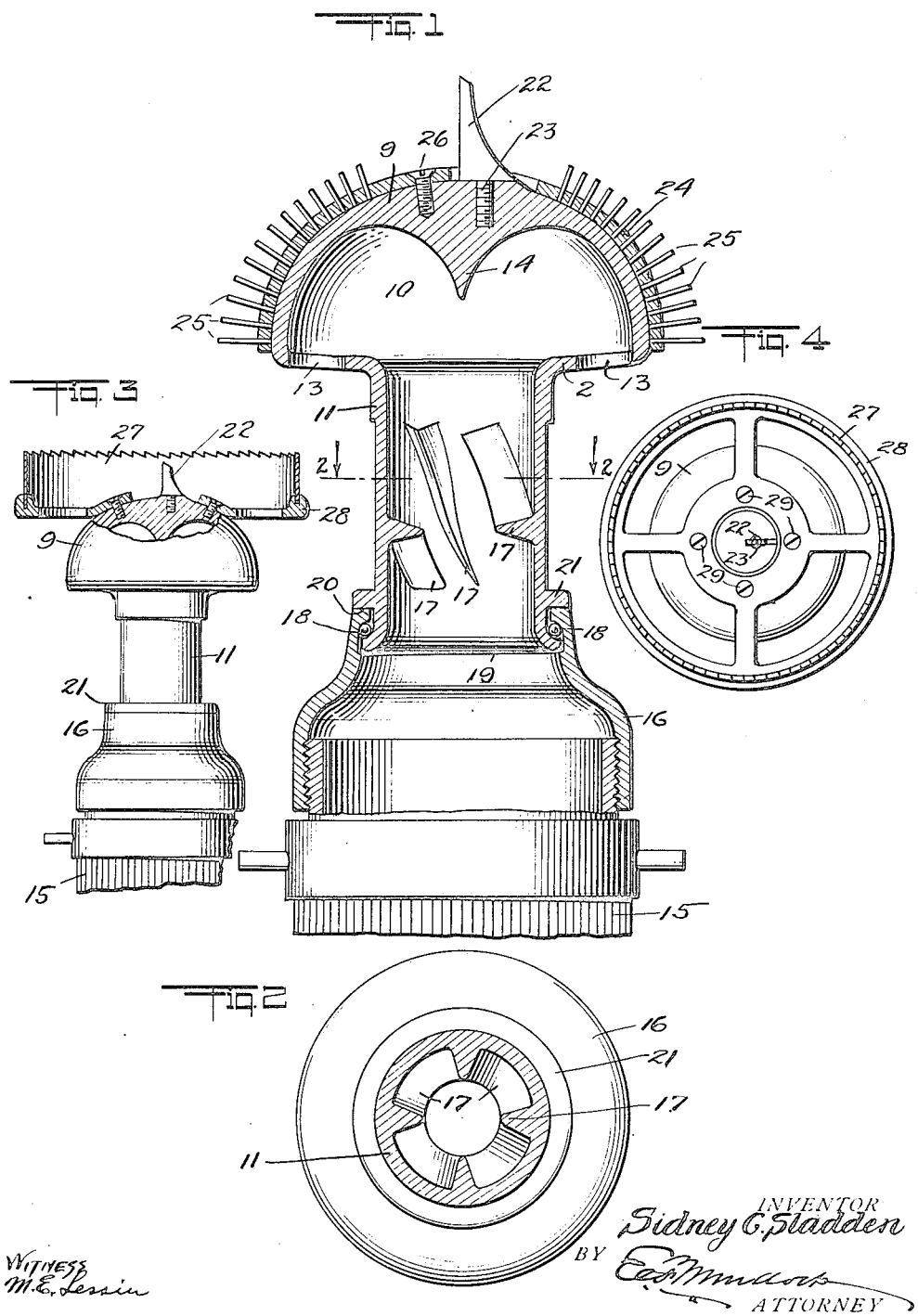

SIDNEY C. SLADDEN, OF NEW YORK, N. Y.

SELF-PROPELLING ROTARY CUTTER.

1,426,919.     Specification of Letters Patent.     Patented Aug. 22, 1922.

Application filed February 14, 1921. Serial No. 444,993.

*To all whom it may concern:*

Be it known that I, SIDNEY C. SLADDEN, a citizen of the United States, and a resident of New York city, in the county and State of New York, have invented certain new and useful Improvements in Self-Propelling Rotary Cutters, of which the following is a full, clear, and exact description.

Among the principle objects which the present invention has in view are: to clear a passageway of obstacles, the removal of which requires the operation of cutting tools; to propel a tool of the character mentioned through a passage to a point otherwise inaccessible by uniting the propelling force and the cutting impulse; to coordinate the cutting and propelling forces to secure both effects with the same medium; and to simplify and cheapen the construction of the apparatus operating in the manner set forth.

Drawings.

Figure 1 is a longitudinal section of a cutter as characterized, constructed and arranged in accordance with the present invention;

Figure 2 is a cross section of the same, the section being taken as on the line 2—2 in Figure 1;

Figure 3 is a side view of an apparatus as characterized showing in conjunction therewith a rotary saw cutter, the cutter and portion of the apparatus being shown in section;

Figure 4 is a front end view in modified form of the invention shown in Figure 3.

Description.

The apparatus herein disclosed consists primarily of a prime mover which is rotated and propelled by the same force, applied adjacent to the location of the work to be accomplished, and an abrasive boring or cutting tool. The tools mentioned are preferably detachably attached to the prime mover, as shown in the drawings.

As seen in the drawings the prime mover referred to embodies a head 9 to which the various tools are attached in service. The head 9 has a hollow chamber 10, and a tubular neck 11 which opens into said chamber. The neck 11 is of smaller diameter than the head 9, thereby forming a rearwardly overhanging wall 12, wherein a number of delivery apertures 13 are formed. The inner wall of the chamber 10 is radially curved or arched by forming in the head an inverted pyramidal projection 14, the apex whereof is coincident with the axis of the neck 11. The curvature of the inner surface of the chamber 10 is continuous and designed to part the stream of fluid delivered through the neck 11 to spread and deliver the same through the apertures 13 to the surrounding medium enveloping the head 9 and parts connected therewith.

The direction of the delivery of the fluid thus guided by the inner wall of the chamber 10 is in direction substantially parallel to the axis of the neck 11. By reason of this arrangement the maximum efficiency of the fluid thus reversed in its direction is obtained as a pushing or propelling force on the head 9. This force is relied upon to move the head 9 and tools carried thereby to the point of operation thereof and for pressing the said head and tools against the object upon which the said tools are operating.

The rotary force imparted to the head 9 is the result of the fluid which is delivered from the hose pipe through the coupling 16 to and through the neck 11. In the passage of the said liquid through the neck 11 it impinges upon the inclined veins 17, the thrust imparted thereto resulting in rotating the neck 11 and head 9 in the manner provided by the veins of certain well known forms of turbine motors.

To lessen the friction of rotation of the neck 11 a friction reducing bearing embodying the bearing balls 18 is formed by overturning or expanding the inner end 19 of the neck 11. The overturned end 19 and the flange 20 formed on the coupler 16 form the race provided for the balls 18. An annular flange 21 formed on the neck 11 holds the said neck and coupler in operative relation.

In service a number of tools may be employed in conjunction with the head 9. To illustrate this there is shown in Figure 1 a boring bit 22, which has a screw-threaded extension 23 that is screwed into a socket provided in the second portion of the head 9.

In Figure 1 also is shown an abrasive brush which has a jacket 24 and a number of wire bristles 25 mounted in the said jacket to extend in front of and laterally from the said head. To secure the said jacket 24 in active position a fastening member, such as the screw 26, is employed. A brush such as indicated is very desirable particularly for such service as cleaning or clearing sewer pipes and similar conduits.

In Figures 3 and 4 a cylindrical saw blade 27 is attached to the said head 9 by means of a spider 28. The spider 28 is held in service position by means of screws 29, as shown best in Figure 4 of the drawings.

When the prime mover is armed with a tool such as the saw blade 27, it is found to be peculiarly serviceable for such work as removing roots or similar obstructions from sewer pipes through which the apparatus has been forced, pulling the pipe 15 therethrough. When the bit 22 or the bristles 25 or the saw 27 engages the obstacle in its path the said tool is held up to its work by the force supplied thereto by the fluid passing from the chamber 10 through the apertures 13 and by the pressure of the said fluid on the surrounding medium. Also the head 9 continues to rotate by reason of the pressure exerted on the veins in the neck 11 by the fluid flowing through the said neck to the chamber 10. Thus the apparatus provides for conveying the operating tools to the point of operation; for maintaining the operating position of the said tools and for performing the functions of the operating position.

While I have shown in the accompanying drawings and have herein described a limited number of tools as carried by the head 9, it will be understood that any tool which operates in correspondence with the rotary drive of the head 9 may be so employed.

*Claims.*

1. An apparatus as characterized comprising a prime mover having rearwardly disposed fluid delivery openings for moving the apparatus forwardly through a surrounding medium; means for supplying said apparatus with fluid under pressure; and means for rotating said apparatus on its axis, said means being actuated by the fluid delivered to said apparatus.

2. An apparatus as characterized comprising a prime mover having rearwardly disposed fluid delivery openings for moving the apparatus forwardly through a surrounding medium; means for supplying said apparatus with fluid under pressure; and means for rotating said apparatus, said means embodying a series of inclined members mounted on said apparatus in the path of the fluid being delivered thereto.

3. An apparatus as characterized comprising a prime mover having rearwardly disposed fluid delivery openings for moving the apparatus forwardly through a surrounding medium; means for supplying said apparatus with fluid under pressure; and a tubular neck fixedly mounted on said apparatus for delivery of said fluid thereto, said neck having a series of internally extended veins inclined to the axis of said neck to form obstructions in the path of said fluid.

4. An apparatus as characterized comprising a prime mover having rearwardly disposed curved delivery openings for moving the apparatus forwardly through a surrounding medium; means for supplying said apparatus with fluid under pressure; means for rotating said apparatus, said means embodying a series of inclined members mounted on said apparatus in the path of the fluid being delivered thereto; and a cutting member mounted on said apparatus and extended forwardly in the path thereof.

5. An apparatus as characterized comprising a prime mover rotatively mounted on a delivery pipe, said prime mover having a delivery neck extending therefrom, the interior of said neck being provided with a series of inclined members to be operated upon by the fluid passing through said neck to rotate said prime mover; and a cutting tool fixedly mounted on said prime mover to extend forward thereof.

SIDNEY C. SLADDEN.